US 8,608,156 B2

(12) United States Patent
Morinaga

(10) Patent No.: US 8,608,156 B2
(45) Date of Patent: Dec. 17, 2013

(54) DRIVE SWITCHING MECHANISM AND FEEDING DEVICE

(75) Inventor: Kazuyuki Morinaga, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/612,574

(22) Filed: Sep. 12, 2012

(65) Prior Publication Data

US 2013/0005527 A1    Jan. 3, 2013

Related U.S. Application Data

(63) Continuation of application No. 12/536,330, filed on Aug. 5, 2009, now Pat. No. 8,292,288.

(30) Foreign Application Priority Data

Aug. 7, 2008    (JP) ................................. 2008-204523

(51) Int. Cl.
   *B65H 5/00*    (2006.01)
(52) U.S. Cl.
   USPC ....................................... 271/10.13; 475/302
(58) Field of Classification Search
   USPC ......... 271/10.04, 10.12, 10.13, 127; 475/269, 475/294, 302, 900
   See application file for complete search history.

(56) References Cited

U.S. PATENT DOCUMENTS

| | | | | |
|---|---|---|---|---|
| 4,346,878 A * | 8/1982 | Aizawa | ......................... | 271/118 |
| 5,927,705 A * | 7/1999 | Becker et al. | ................. | 271/114 |
| 6,056,285 A * | 5/2000 | Kikuta et al. | ................. | 271/118 |
| 6,547,236 B1 * | 4/2003 | Yip et al. | ....................... | 271/115 |
| 7,513,496 B2 * | 4/2009 | Hattori | ........................... | 271/127 |
| 7,641,186 B2 * | 1/2010 | Asai et al. | ..................... | 271/117 |
| 7,758,041 B2 * | 7/2010 | Okuno et al. | ................. | 271/147 |
| 7,766,317 B2 * | 8/2010 | Okuno | ........................ | 271/10.13 |
| 2007/0273081 A1 * | 11/2007 | Sonoda | ........................ | 271/114 |
| 2010/0104311 A1 * | 4/2010 | Okamoto | ........................ | 399/75 |
| 2013/0005527 A1 * | 1/2013 | Morinaga | ..................... | 475/302 |

FOREIGN PATENT DOCUMENTS

| | | | | | |
|---|---|---|---|---|---|
| JP | 2004075277 A | * | 3/2004 | ............... | B65H 3/52 |
| JP | 2005351435 A | * | 12/2005 | ............... | F16H 1/20 |

* cited by examiner

*Primary Examiner* — Jeremy R Severson
(74) *Attorney, Agent, or Firm* — Canon USA Inc IP Division

(57) ABSTRACT

A drive switching mechanism includes a transmission gear and a planetary gear configured to transmit a drive from an input gear to an output gear. The drive switching mechanism further includes a swinging member configured to hold the planetary gear such that the planetary gear can swing around the input gear, a retaining unit configured to retain the swinging member in a swing enabled or disabled state, and a releasing unit configured to disengage the planetary gear from the output gear and cause them to be spaced apart. The output gear includes a toothless part that does not engage with a gear section engaging with the transmission gear.

9 Claims, 13 Drawing Sheets

DRIVE SWITCHING MECHANISM AND FEEDING DEVICE

CROSS REFERENCE TO RELATED APPLICATIONS

The present application is a continuation of U.S. patent application Ser. No. 12/536,330, filed on Aug. 5, 2009, the content of which is expressly incorporated by reference herein in its entirety. This application also claims the benefit of Japanese Application No. 2008-204523 filed Aug. 7, 2008, which is hereby incorporated by reference herein in its entirety.

BACKGROUND OF THE INVENTION

1. Field of the Invention

The present invention relates to a drive switching mechanism for switching transmission of a drive and to a feeding device including the drive switching mechanism.

2. Description of the Related Art

In a recording apparatus, such as a printer, a copier, or a facsimile machine, or a reading apparatus, such as a scanner, to form an image on a sheet material (a recording medium (e.g., paper) or a document) or read a formed image, sheet materials stacked on a sheet stacking portion are separated one by one. A separated sheet material is conveyed by a conveying portion to a recording portion or a reading portion. After the completion of forming or reading the image, the sheet material is ejected from the apparatus by an ejecting portion. Many recording apparatuses or reading apparatuses that switch a drive from a single driving source using a drive switching mechanism, separate sheets, and convey a separated sheet to achieve a more inexpensive configuration are developed nowadays. Examples of such a known configuration are described in detail in Japanese Patent Laid-Open Nos. 2004-075277 and 2005-351435.

Japanese Patent Laid-Open No. 2004-075277 discloses an apparatus having a configuration in which a feeding portion that includes a drive switching mechanism is driven by a driving force transmitted from a driving source through a conveying roller. The drive switching mechanism includes a sun gear and two planetary gears engaging with the sun gear. A first planetary gear drives a feeding roller gear in a direction in which sheets are conveyed through a control gear by the conveying roller rotating in a forward direction. A second planetary gear directly drives the feeding roller gear in the direction in which sheets are conveyed by the conveying roller rotating in a backward direction. In this drive switching mechanism, the feeding roller is driven by the conveying roller backwardly rotating to start separating recording sheets and feeding a separated recording sheet. The front end of the separated recording sheet comes into contact with a nip portion formed between the conveying roller backwardly rotating and a pinch roller being pressed into contact with and following the conveying roller, and skew of the front end is corrected along the nip line. After that, the recording sheet is conveyed to the recording portion by the conveying roller forwardly rotating, and an image is formed on the recording sheet. Then, the sheet is ejected from the apparatus.

Japanese Patent Laid-Open No. 2005-351435 discloses an apparatus having another configuration in which a feeding portion that includes a drive switching mechanism is driven by a driving force transmitted from a driving source through a conveying roller. The drive switching mechanism includes a sun gear and two planetary gears engaging with the sun gear. A first planetary gear drives a feeding roller gear in a direction in which sheets are conveyed through a control gear by the conveying roller rotating in a forward direction. The first planetary gear also includes a one-way clutch. Thus, during forward rotation of the conveying roller the driving force of the planetary gear can be transmitted, whereas during backward rotation thereof the planetary gear idles and the driving force is not transmitted. A second planetary gear directly drives the feeding roller gear in the direction in which sheets are conveyed by the conveying roller rotating in a backward direction. The first and second planetary gears are in a standby state in which they do not carry out feeding in normal times by a stopper that restricts swinging. When a carriage is moved to a position where the stopper is released and the conveying roller is forwardly driven, the control gear is engaged with a planetary gear and the feeding roller is driven in the direction in which sheets are conveyed. The control gear has a groove for engaging with an arm of the first gear. During feeding, swinging of the first planetary gear is restricted, and the first planetary gear maintains a state in which it always engages with the control gear. Accordingly, even if the planetary gears are driven in the forward or backward direction during feeding of recording sheets, a drive can be transmitted by the planetary gears without delay. This enables correction of skew of the front end of a recording sheet along a nip after the recording sheet is transported to the conveying roller backwardly rotating and also enables correction of skew of the front end of a recording sheet along a nip after the recording sheet is temporarily engaged in the conveying roller forwardly rotating and then is reversely moved to the roller nip position by the conveying roller backwardly rotating. Additionally, feeding without the above correction of skew of the front end can also be carried out, so various kinds of feeding can be performed depending on the type of a sheet.

The drive switching mechanism described in Japanese Patent Laid-Open No. 2004-075277 feeds a sheet by backwardly rotating the conveying roller on all occasions. Because it is necessary to forwardly rotate the conveying roller until printing on a previous page and ejecting the sheet are completed, a next page cannot be fed until then. That is, it is difficult to improve throughput by feeding a next page during ejection of a previous page.

The drive switching mechanism described in Japanese Patent Laid-Open No. 2005-351435 starts feeding by forwardly rotating the conveying roller. It is possible to feed a next page during ejection of a previous page (forward rotation of the conveying roller). Due to the groove of the control gear, the first planetary gear always engages with the control gear during feeding. However, after feeding, it is necessary to release engagement between the planetary gear and the control gear in order to avoid further feeding resulting from forward rotation of the conveying roller in subsequent conveying. To this end, the conveying roller needs rotating slightly in the backward direction to release the engagement between the planetary gear and the control gear after the completion of feeding. Although a time required for backward rotation for each page is rather short, in these days, when further improvement in throughput is being demanded, the time required to release the engagement cannot be ignored.

In terms of improvement in throughput, backward rotation of the conveying roller during feeding of a recording sheet is preferably minimized except for backward movement necessary for skew correction of a sheet. Accordingly, a drive switching mechanism that completes feeding using forward rotation alone is desired.

SUMMARY OF THE INVENTION

The present invention provides a drive switching mechanism capable of achieving improved throughput in drive switching and stabilized operation using a simple configuration. The present invention also provides a feeding device capable of achieving enhanced performance of aligning the front end of a sheet material.

According to an aspect of the present invention, a drive switching mechanism for switching between transmission and non-transmission of a driving force of a drive motor from an input gear to an output gear is provided. The drive switching mechanism includes a transmission gear, a planetary gear, a swinging member, a retaining unit, and a releasing unit. The transmission gear is configured to transmit a drive from the input gear to the output gear. The planetary gear is configured to transmit a drive from the input gear to the output gear. The swinging member is configured to hold the planetary gear such that the planetary gear can swing around the input gear and can engage with the output gear. The retaining unit is configured to retain the swinging member in either one of a state in which the swinging member can swing and a state in which the output gear and the planetary gear are not engaged. The releasing unit is configured to disengage the planetary gear and the output gear and cause them to be spaced apart from each other. The output gear includes a toothless part that does not engage with the transmission gear and that does not receive a drive from the transmission gear. The retaining unit retains the swinging member such that the swinging member can swing in a state in which the transmission gear and the output gear are disengaged by the toothless part. Driving the drive motor causes the output gear and the planetary gear to engage with each other and rotates the output gear. After the toothless part is passed and the transmission gear and the output gear become engaged, the releasing unit disengages the planetary gear and the output gear.

According to another aspect of the present invention, a feeding device for separating and conveying recording sheets stacked on a stacking portion one by one is provided. The feeding device includes a driving motor, a feeding roller configured to convey a recording sheet, a pressing plate on which a plurality of recording sheets can be stacked, an urging unit configured to urge the pressing plate against the feeding roller, a control cam configured to cause the pressing plate to swing between a position at which a recording sheet on the pressing plate is pressed into contact with the feeding roller and a position at which the recording sheet is spaced apart from the feeding roller, a control-cam driving gear configured to drive the control cam, and a drive transmitting unit configured to transmit a driving force from the driving motor to the control-cam driving gear through a plurality of gears. The drive transmitting unit includes a sun gear configured to receive a driving force from the driving motor, a transmission gear configured to transmit a drive from the sun gear to the control-cam driving gear, a planetary gear configured to transmit a drive from the sun gear to the control-cam driving gear, a swinging member configured to hold the planetary gear such that the planetary gear can swing around the sun gear and engage with the control-cam driving gear, a retaining unit configured to retain the swinging member in either one of a state in which the swinging member can swing and a state in which the control-cam driving gear and the planetary gear are not engaged, and a releasing unit configured to disengage the planetary gear and the control-cam driving gear and cause them to be spaced apart from each other. The retaining unit is formed of at least a fit section disposed in the swinging member and a lever member that can be fit in the fit section. The releasing unit is formed of at least a cam surface disposed in the control-cam driving gear and a cam follower section disposed in the swinging member so as to be able to engage with the cam surface. The control-cam driving gear includes a toothless part that does not engage with the transmission gear and that is incapable of transmitting a drive. The retaining unit brings the swinging member to the state in which the swinging member can swing from a state in which the transmission gear and the control-cam driving gear are disengaged by the toothless part, and driving the drive motor causes the control-cam driving gear and the planetary gear to engage with each other and rotates the control-cam driving gear. After the toothless part is passed and the transmission gear and the control-cam driving gear become engaged, the releasing unit disengages the planetary gear and the control-cam driving gear.

With at least one embodiment of the present invention, in a drive switching mechanism for switching between feeding and conveying using a single driving source, throughput can be improved, and operation can be stabilized. In addition, with at least one embodiment of the present invention, a feeding device enabling different kinds of alignment of the front end of a sheet material depending on the type of the sheet and having enhanced performance can be provided.

Further features of the present invention will become apparent from the following description of exemplary embodiments with reference to the attached drawings.

DESCRIPTION OF THE EMBODIMENTS

Figure 1:
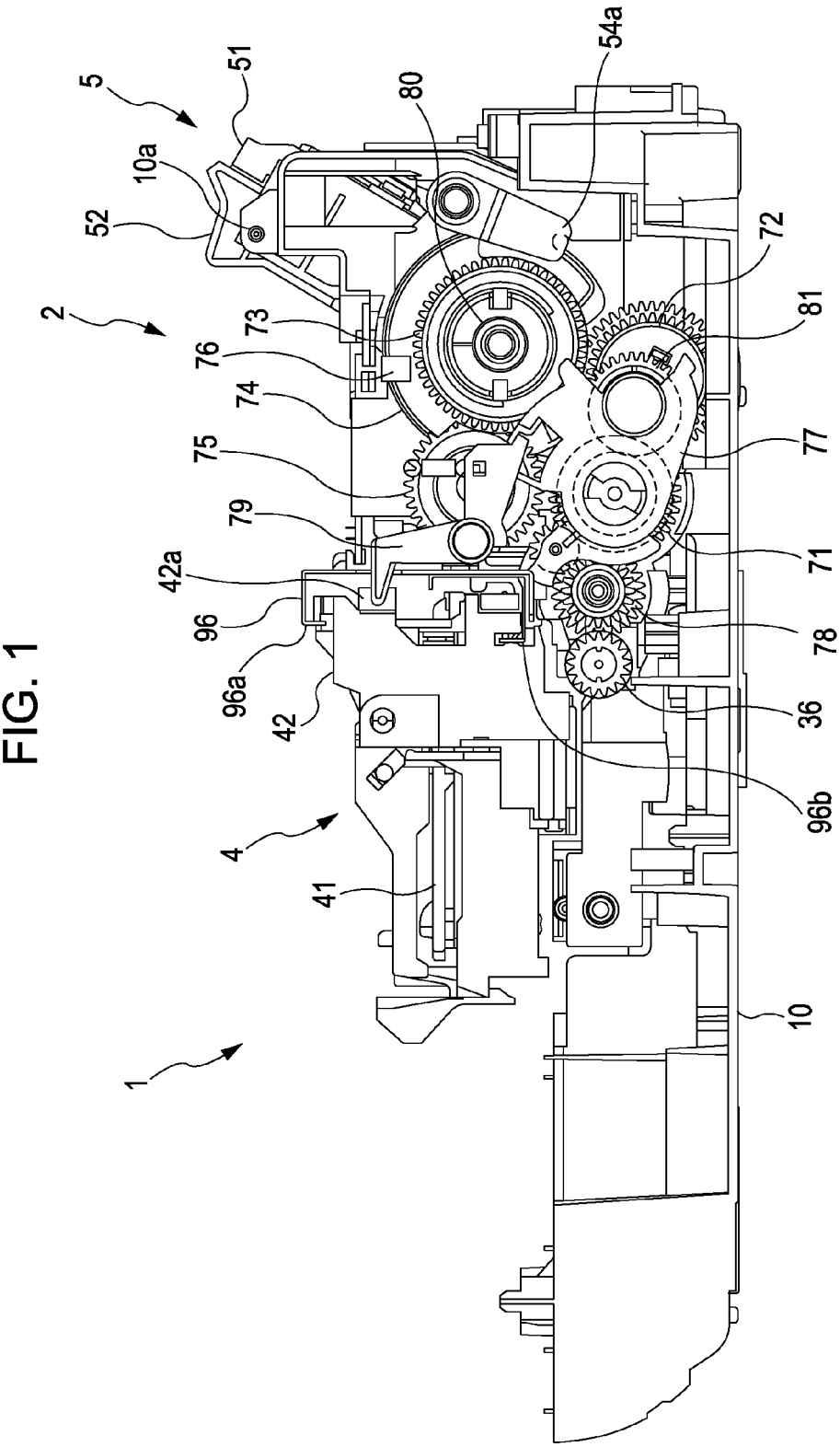
FIG. 1 is a cross-sectional view of an apparatus for use in describing a drive switching mechanism according to an embodiment of the present invention.
Figure 2:
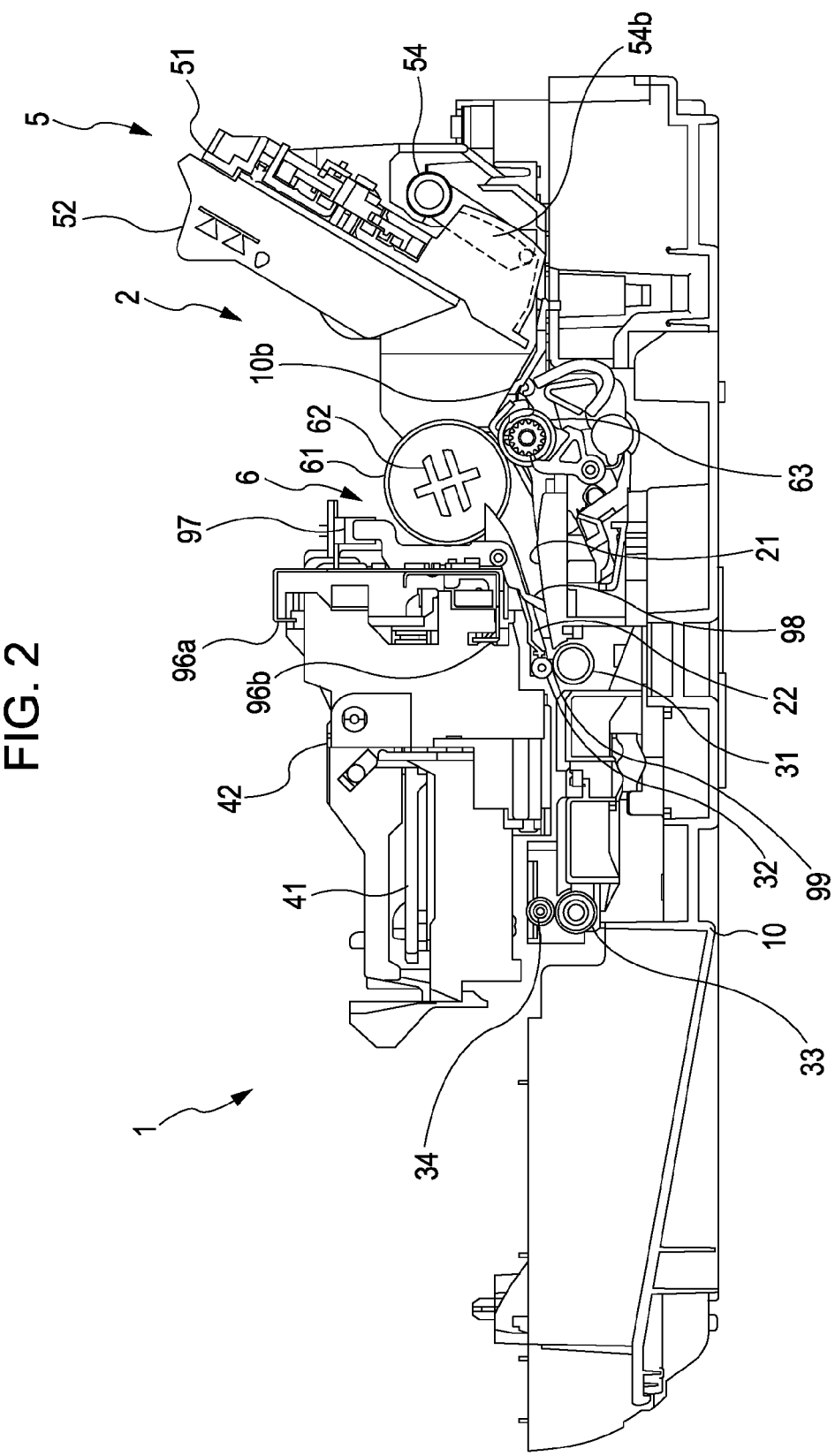
FIG. 2 is a cross-sectional view of an apparatus including a drive switching mechanism according to an embodiment of the present invention.
Figure 3:
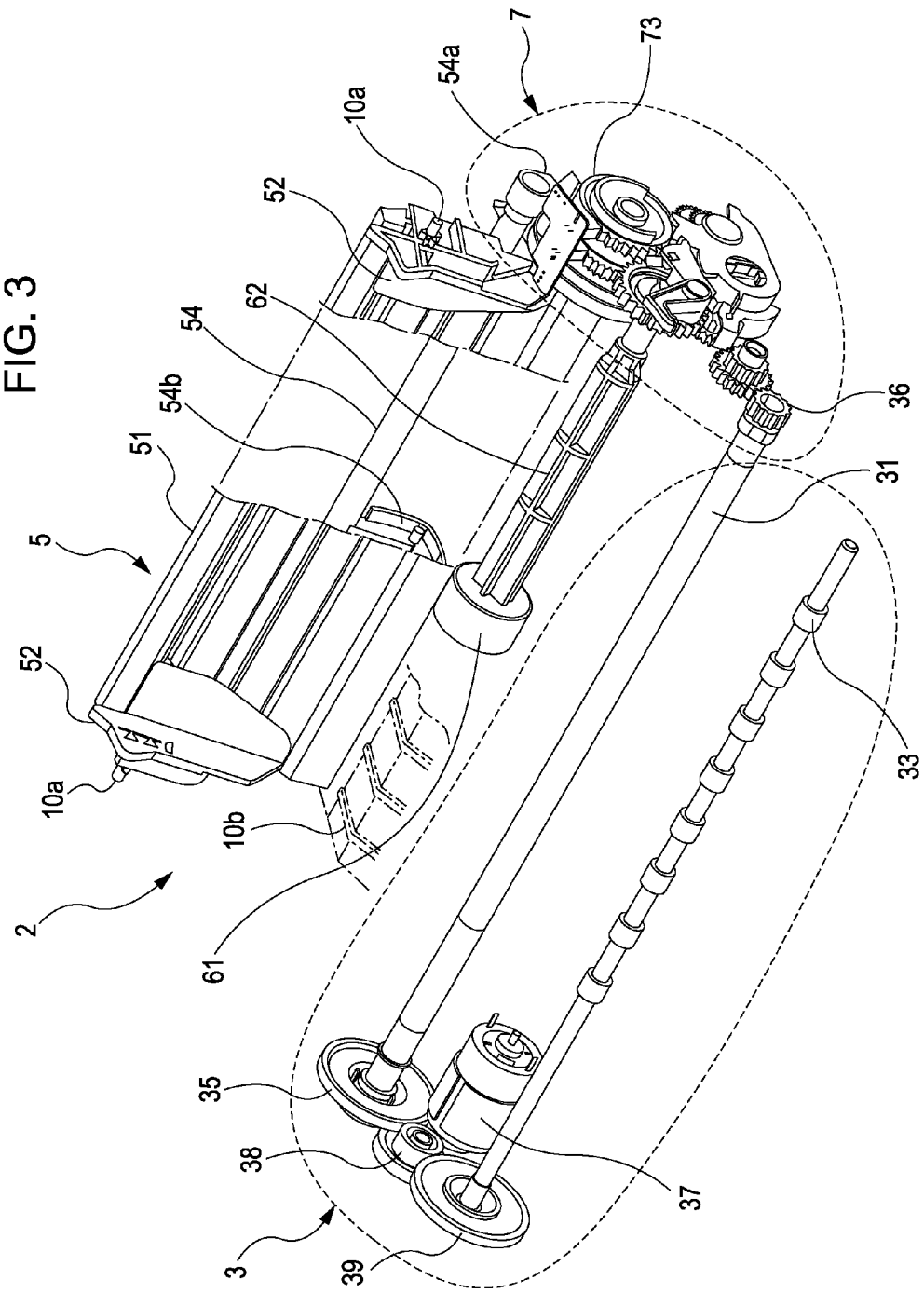
FIG. 3 is a perspective view of a drive switching mechanism according to one embodiment of the present invention.
Figure 4:
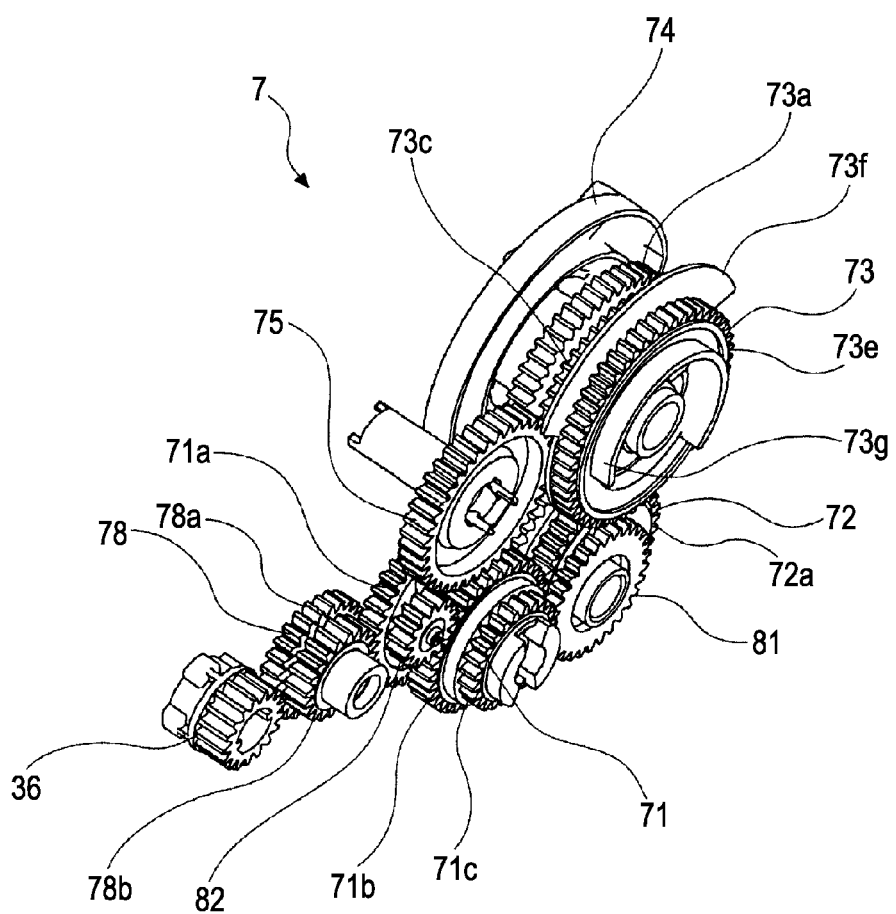
FIG. 4 is a perspective view for use in describing a driving portion.

An exemplary embodiment of the present invention will be described below with reference to the drawings. In the drawings, the same reference numerals represent the same or corresponding elements. FIG. 1 is a schematic longitudinal section view of a drive switching mechanism of a feeding device (feeding portion) included in a recording apparatus according to the present embodiment. FIG. 2 is a schematic longitudinal section view of the recording apparatus including the feeding device according to the present embodiment. FIG. 3 is a schematic perspective view of the drive switching mechanism according to the present embodiment. FIG. 4 is a perspective view for use in describing a driving portion.

A recording apparatus 1 includes a feeding device including a drive switching mechanism for switching between transmission and non-transmission of a driving force of a driving motor from an input gear to an output gear and a recording portion 4 for forming an image on a sheet material (recording sheet) conveyed by the feeding device. The feeding device includes at least a feeding portion 2 for separating stacked sheet materials and feeding a separated sheet material and a conveying portion 3 for conveying a fed sheet. First, the feeding portion 2 is described in detail. The feeding portion 2 includes a sheet-material stacking portion 5 on which a plurality of sheet materials are stacked, a separating and feeding portion 6 for separating a sheet material from the sheet materials on the sheet-material stacking portion 5, and a driving portion 7 for driving the separating and feeding portion 6. The sheet-material stacking portion 5 includes a pressing plate 51 attached on a base 10. The pressing plate 51 is pivotable about a pivot 10a and can receive a plurality of sheet materials stacked thereon.

Sheet materials stacked on the sheet-material stacking portion 5 are inclined, so they are biased by gravity downward. Because of this, the front ends of the sheet materials abuts on a sheet-material front-end reference portion 10b fixed at the base 10. Stacking sheet materials so as to incline them can reduce the size of setting the sheet-material stacking portion 5 and can also contribute to the miniaturization of the entire apparatus. In the present embodiment, to reduce the load in feeding, the sheet-material front-end reference portion 10b is formed so as to have a rib shape. Opposite side guides 52 are disposed on the pressing plate 51 to restrict both sides of stacked sheet materials.

The side guides 52 are attached on the pressing plate 51 so as to be slidable in a wide direction of a sheet material and can restrict both side ends of a sheet material to any width within a predetermined range. The pressing plate 51 is urged toward a feeding roller 61 by an urging unit (not shown) such that the pivot 10a of the base 10 serves as its center of pivoting. Pivoting of the pressing plate 51 is restricted by a control cam 74 included in the driving portion 7 through a pressing-plate release lever 54, as described below. That is, when the control cam 74 releases the restriction of the pressing-plate release lever 54, the pressing plate 51 is urged so as to pivot toward the feeding roller 61 by the urging unit (not shown) and the control cam 74 causes a first end 54a of the pressing-plate release lever 54 to pivot against the urging force of the urging unit (not shown). This makes a second end 54b of the pressing-plate release lever 54 to pivot in a direction that becomes separated by pressing the pressing plate 51 down. The details of this operation of the pressing plate 51 will be described below.

Next, the separating and feeding portion 6 is described in detail. The separating and feeding portion 6 includes the feeding roller 61 for sending sheet materials stacked on the sheet-material stacking portion 5 and a separation roller 63 for separating sheet materials one by one by coming into contact with the feeding roller 61. As described above, driving the feeding roller 61 so as to rotate it while the feeding roller 61 is pressed into contact with a sheet stuck urged by the pressing plate 51 feeds the uppermost sheet material of the sheet stack by a frictional force. In such a way, the feeding roller 61 conveys a sheet material by a frictional force. Accordingly, the feeding roller 61 can be made of a rubber material having a relatively high coefficient of friction, for example, ethylene-propylene diene terpolymer (EPDM) or a urethane foam.

A feeding roller gear 75 is disposed on a first end of a feeding roller shaft 62 on which the feeding roller 61 is attached, and a driving force is transmitted from a driving source, which will be described below. The feeding roller gear 75 engages with a control gear 73. When a plurality of sheet materials enter the nip portion formed between the feeding roller 61 and the separation roller 63, the separation roller 63 serving as a separation unit separates the sheet materials and feeds them one by one. Basically, the frictional force between the feeding roller 61 and the uppermost sheet material is larger than the frictional force between the uppermost sheet material and a sheet material immediately below the uppermost sheet material. Thus, only the uppermost sheet material is conveyed.

Then, the driving portion 7 for driving the feeding portion 2 is described in detail. The driving portion 7 includes the feeding roller gear 75 for driving the feeding roller 61 so as to rotate it, the control gear 73 and the control cam 74 driven so as to be integrally rotated, a first planetary gear 81, a second planetary gear 82, and a sun gear (input gear) 71. The driving portion 7 also includes a transmission gear 72 for transmitting a drive from the sun gear 71 to the control gear (output gear) 73, a feeding sensor 76 for detecting the amount of rotation of the control gear 73, and a swing arm 77 serving as a swinging member for swinging the planetary gears around the sun gear 71. The driving portion 7 further includes an idler gear 78 for transferring a driving force from the conveying portion 3 and a stopper 79 for restricting swinging of the swing arm 77.

The feeding roller gear 75 is coaxial with the feeding roller shaft 62, so the rotation of the feeding roller gear 75 rotates the feeding roller shaft 62 and the feeding roller 61.

The sun gear 71 includes a gear section 71a capable of engaging with the idler gear 78, a gear section 71b capable of engaging with the transmission gear 72 and the idler gear 78, and a gear section 71c capable of engaging with the first planetary gear 81. They rotate integrally with each other.

The transmission gear 72 includes a gear section 72a capable of engaging with the gear section 71b of the sun gear 71 and a gear section 72b capable of engaging with the control gear 73. A one-way clutch is disposed between the gear sections 72a and 72b. The one-way clutch allows a drive to be transmitted to the gear section 72b when the gear section 72a is rotated clockwise and prevents a drive from being transmitted to the gear section 72b when the gear section 72a is rotated counterclockwise. The idler gear 78 includes a first gear section 78a engaged with a conveyance output gear 36 and a second gear section 78b engaged with the gear section 71a of the sun gear 71. The idler gear 78 transfers a driving force of the conveyance output gear 36 to the sun gear 71.

The control gear 73 includes a first gear section 73a capable of engaging with the gear section 72b of the transmission gear 72 and a toothless part 73b in the first gear section 73a. The control gear 73 also includes a second gear section 73c capable of engaging with the feeding roller gear 75 and a toothless part 73d in the second gear section 73c. The control gear 73 further includes a third gear section 73e capable of engaging with the first planetary gear 81 and a light-shielding section 73f for blocking a detection beam of the feeding sensor 76. The light-shielding section 73f is rotated integrally with the control gear 73 together in accordance with the rotation of the control gear 73. A control gear clutch 80 is attached on the control gear 73 and restricts clockwise rotation of the control gear 73. The control cam 74 is disposed coaxially with the control gear 73 and is rotated synchronously with the control gear 73. The control cam 74 has a cam surface that engages with the pressing-plate release lever 54, restricts swinging of the pressing plate 51, and separates the pressing plate 51 and the feeding roller 61 from each other through the pressing-plate release lever 54. That is, the control gear 73, which is an output gear, also functions as a control-cam driving gear for driving the control cam 74, which is a control cam.

The feeding sensor 76 includes a light source for emitting a detection beam and a photo detector for receiving the detection beam from the light source, both of which are not illustrated. The position of rotation of the control gear 73 is detected by the light-shielding section 73f of the control gear 73 blocking the detection beam. A loading member (not shown) causes the swing arm 77 to have friction between the sun gear 71 and the swing arm 77. The rotation of the sun gear 71 swings the swing arm 77. That is, when the sun gear 71 is counterclockwise rotated in the drawings, the swing arm 77 is also swung counterclockwise in the drawings. In accordance with this, the first planetary gear 81 becomes engaged with the control gear 73. When the sun gear 71 is rotated clockwise in the drawings, the swing arm 77 is also swung clockwise in the drawings. This causes the first planetary gear 81 and the control gear 73 to be spaced apart from each other.

The swing arm 77 includes a fit section 77a formed in its outer area. The fit section 77a restricts the position of swinging of the swing arm 77 by coming into contact with the stopper 79. The swing arm 77 also includes an arm section (cam follower section) 77b formed in its outer area. The arm section 77b can engage with a cam section 73g in the control gear 73. In the present embodiment, the terms "clockwise" and "counterclockwise" each indicating the direction in which a member operates represent the direction thereof illustrated in the drawings.

The pivotable stopper 79 includes a working section 79a coming into contact with a cam section 42a of a carriage 42 and a restricting section (lever member) 79b engaged with the fit section 77a of the swing arm 77. The stopper 79 is urged by a tension spring 79c so as to urge the restriction section 79b into engagement with the fit section 77a of the swing arm 77 and restricts clockwise swinging of the swing arm 77. The stopper 79 releases the restriction of swinging of the swing arm 77 by being swung by the cam section 42a in response to movement of the carriage 42.

Then, the conveying portion 3 is described in detail. The conveying portion 3 includes a conveying roller set (a conveying roller 31 and a driven roller 32) arranged upstream in the direction in which a sheet material is conveyed. The conveying rollers pinch a sheet material therebetween and convey it toward a recording unit (recording head) 41. The driven roller 32 is opposed to and pressed into contact with the conveying roller 31 and follows it. The conveying portion 3 also includes a set of a discharge roller 33 and a spur 34 arranged downstream in the direction in which a sheet material is conveyed with respect to the recording unit 41. The discharge roller 33 and the spur 34 convey a sheet material from the recording unit 41 and discharge it. The conveying output gear 36, which is driven so as to be rotated in accordance with rotation of a conveying roller gear 35 for transmitting a drive from a driving motor 37 and of the conveying roller 31, is fixed at the conveying roller 31. A discharge roller gear 39 is rotated integrally with the discharge roller 33. An idle gear 38 transfers a drive from the conveying roller gear 35 to the discharge roller gear 39.

The conveying portion 3 also includes guide members 21 and 22 for guiding a sheet material to a nip portion 99 formed of the conveying roller 31 and the driven roller 32. The conveying portion 3 further includes a sheet-end detection sensor 97 for detecting the position of the front end of a sheet material fed from the conveying roller 31 and the position of the rear end conveyed by the conveying roller 31 and a sheet-end detection lever 98 pivoting in accordance with movement of the front end and the rear end of the sheet material. The sheet-end detection sensor 97 includes a light source for emitting a detection beam and a photo detector for receiving the detection beam from the light source, both of which are not illustrated. The optical path from the light source to the photo detector of the sheet-end detection sensor 97 can be blocked or opened by a first end of the sheet-end detection lever 98. The sheet-end detection lever 98 is supported so as to be pivotable and is disposed such that a second end thereof is situated in a path for conveying a sheet material between a separation portion formed of the separation roller 63 and the nip portion 99 formed of the conveying roller 31 and the driven roller 32.

The sheet-end detection lever 98 is rotated by the front end of a sheet material coming into contact therewith, the sheet material being fed on the conveying path between the separation portion formed of the separation roller 63 and the nip portion 99. In accordance with rotation caused by the front end of the sheet material, one end of the sheet-end detection lever 98 blocks a detection beam of the sheet-end detection sensor 97, thus detecting the front end of the sheet material. Similarly, the sheet-end detection lever 98 is rotated by the rear end of the sheet material passing, one end of the sheet-end detection lever 98 escapes from the optical path of the detection beam, and thus the rear end of the sheet material is detected. One example of the sheet-end detection sensor 97 may be a mechanical detector having a control pressed by the sheet-end detection lever 98.

The conveying portion 3 having the above configuration conveys a sheet material supplied from the feeding portion 2 toward the recording unit 41 using the recording portion conveying roller 31. In the case of an inkjet recording apparatus, a desired image or other representation is recorded on the conveyed sheet material by the recording unit 41 of the recording portion 4 ejecting ink. The conveying portion 3 conveys the sheet material on which an image or other representation is recorded using the discharge roller 33 and the spur 34 and discharges it from the recording apparatus 1.

Then, the recording portion 4 is described in detail. The recording portion 4 includes the recording unit (recording head) 41 for recording an image or other representation on a sheet material and the carriage 42 supporting the recording unit 41. The carriage 42 being guided by rail sections 96a and 96b of a chassis 96 is moved by a driving source (not shown) in a direction of the width of a sheet material. The carriage 42 includes the cam section 42a for causing the stopper 79 to pivot. The cam section 42a causes the stopper 79 to pivot at a cam position outside a range where the recording unit 41 records an image on a sheet material.

Figure 5A:
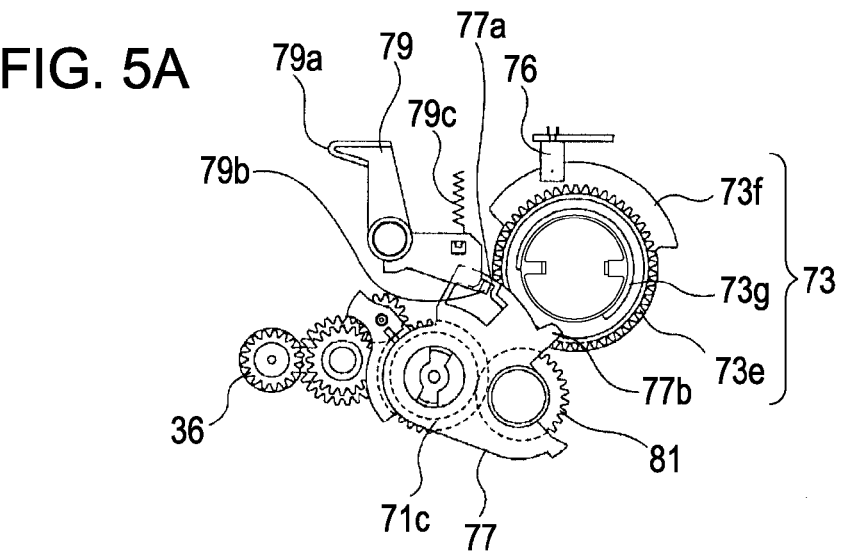
FIGS. 5A to 5C are schematic side views that illustrate an initial state of a drive switching mechanism.
Figure 5B:
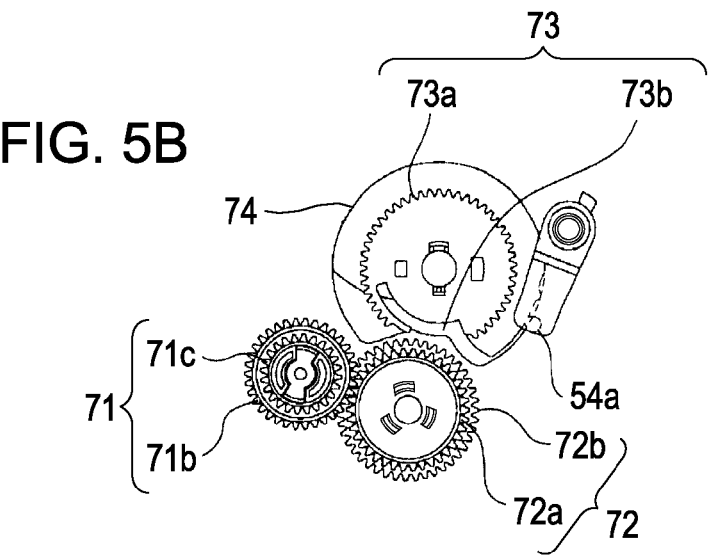
Figure 5C:
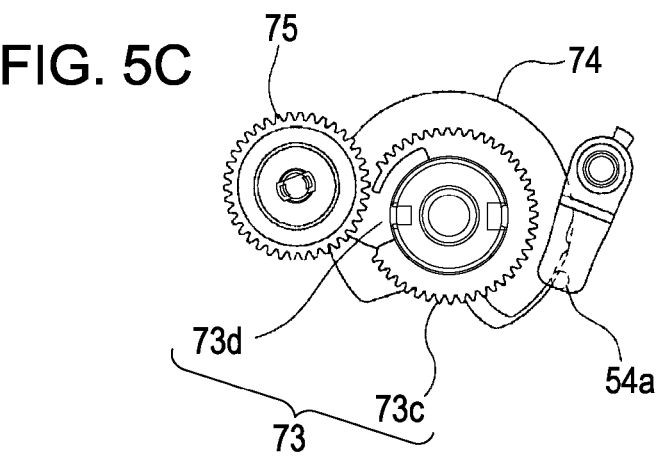

FIGS. 5A, 5B, and 5C are schematic side views that illustrate an initial state of the drive switching mechanism of the feeding device according to the present embodiment. FIG. 5A illustrates an engagement state of the first planetary gear 81 and the control gear 73. FIG. 5B illustrates an engagement state of the transmission gear 72 and the control gear 73. FIG. 5C illustrates an engagement state of the feeding roller gear 75 and the control gear 73.

Figure 6:
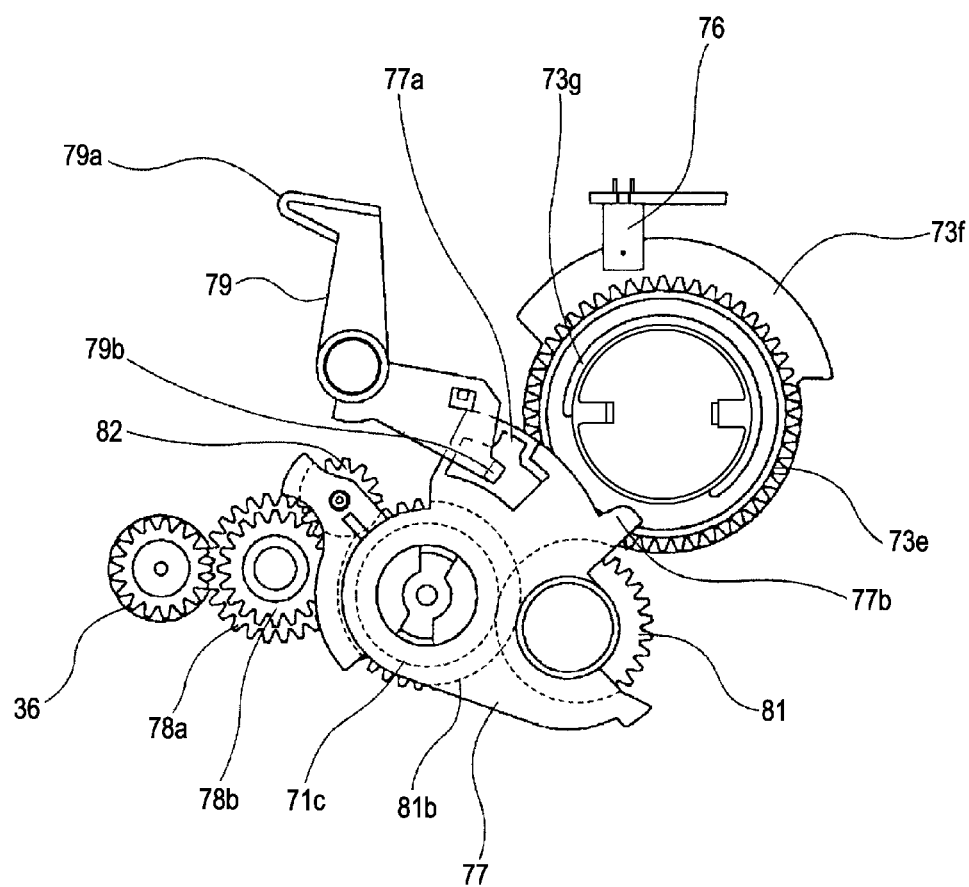
FIG. 6 is a side view that illustrates a state in which a swing arm and a stopper are disengaged.

FIG. 6 illustrates a disengagement state in which the fit section 77a of the swing arm 77 and the restricting section 79b are disengaged by the carriage 42 causing the stopper 79 to pivot.

Figure 7A:
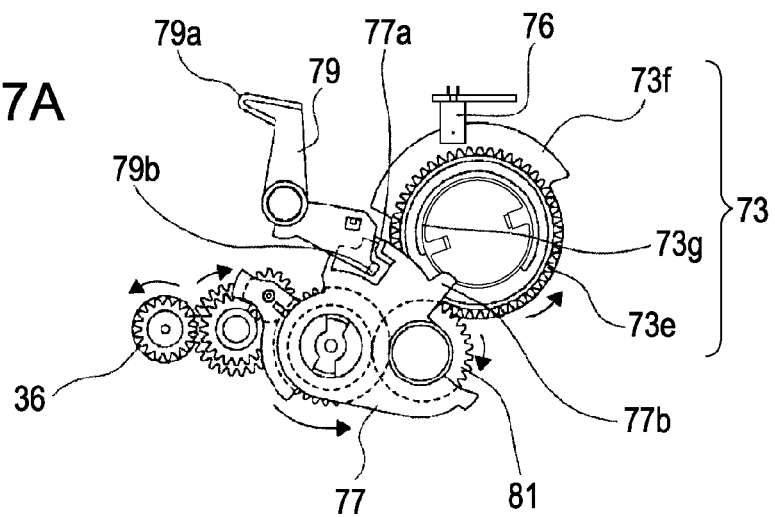
FIGS. 7A to 7C are side views that illustrate a state of a driving portion when a control gear starts its rotation.
Figure 7B:
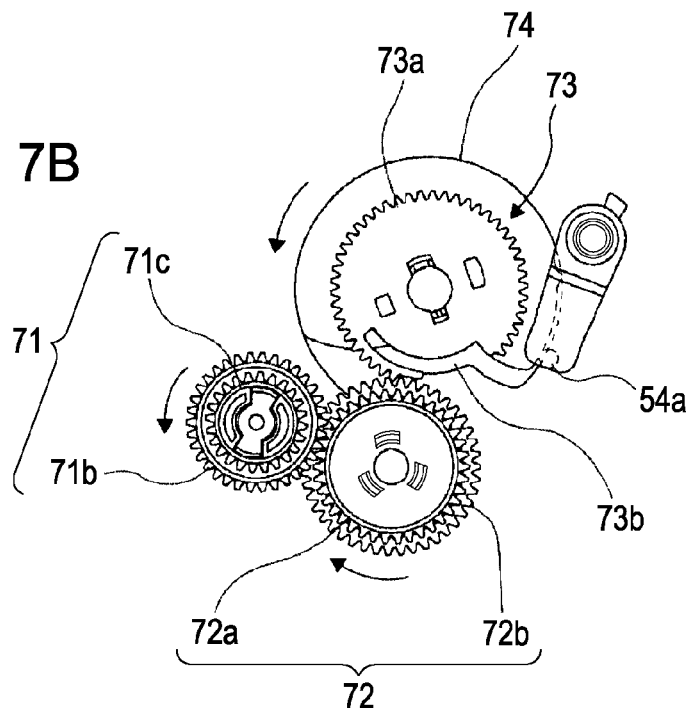
Figure 7C:
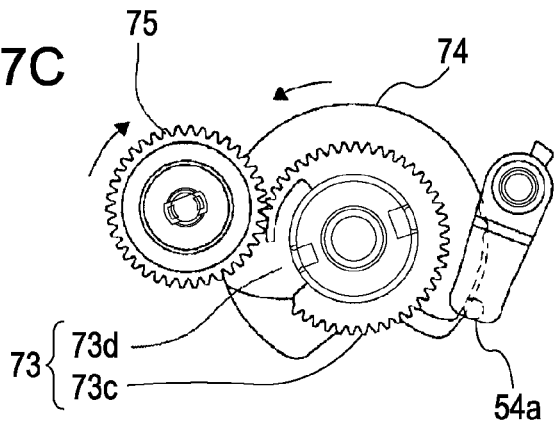

FIGS. 7A, 7B, and 7C illustrate a state of the driving portion when the control gear 73 starts its rotating in response to a drive from the conveyance output gear 36. FIG. 7A illustrates an engagement state of the first planetary gear 81 and the control gear 73. FIG. 7B illustrates an engagement state of the transmission gear 72 and the control gear 73. FIG. 7C illustrates an engagement state of the feeding roller gear 75 and the control gear 73.

Figure 8A:
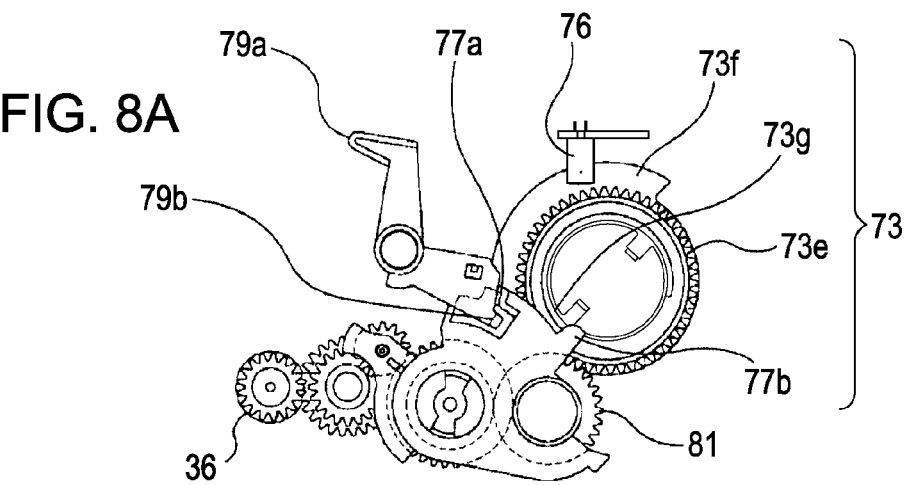
FIGS. 8A to 8C are side views that illustrate a state of a driving portion when a pressing plate rises.
Figure 8B:
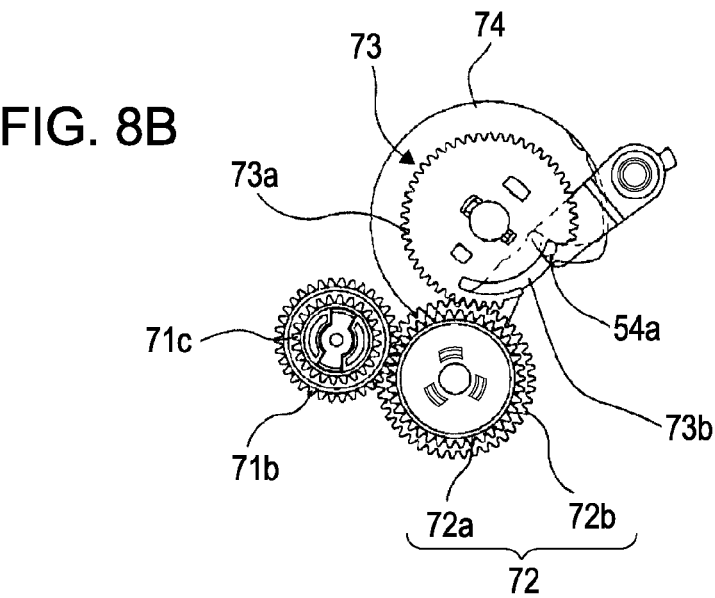
Figure 8C:
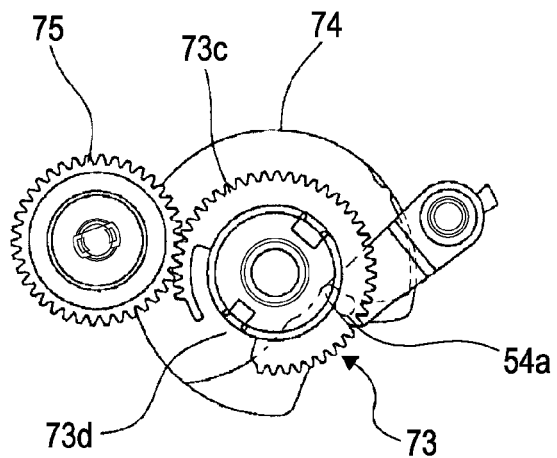

FIGS. 8A, 8B, and 8C illustrate a state of the driving portion when the pressing plate 51 rises. FIG. 8A illustrates an engagement state of the first planetary gear 81 and the control gear 73. FIG. 8B illustrates an engagement state of the transmission gear 72 and the control gear 73. FIG. 8C illustrates an engagement state of the feeding roller gear 75 and the control gear 73.

Figure 9:
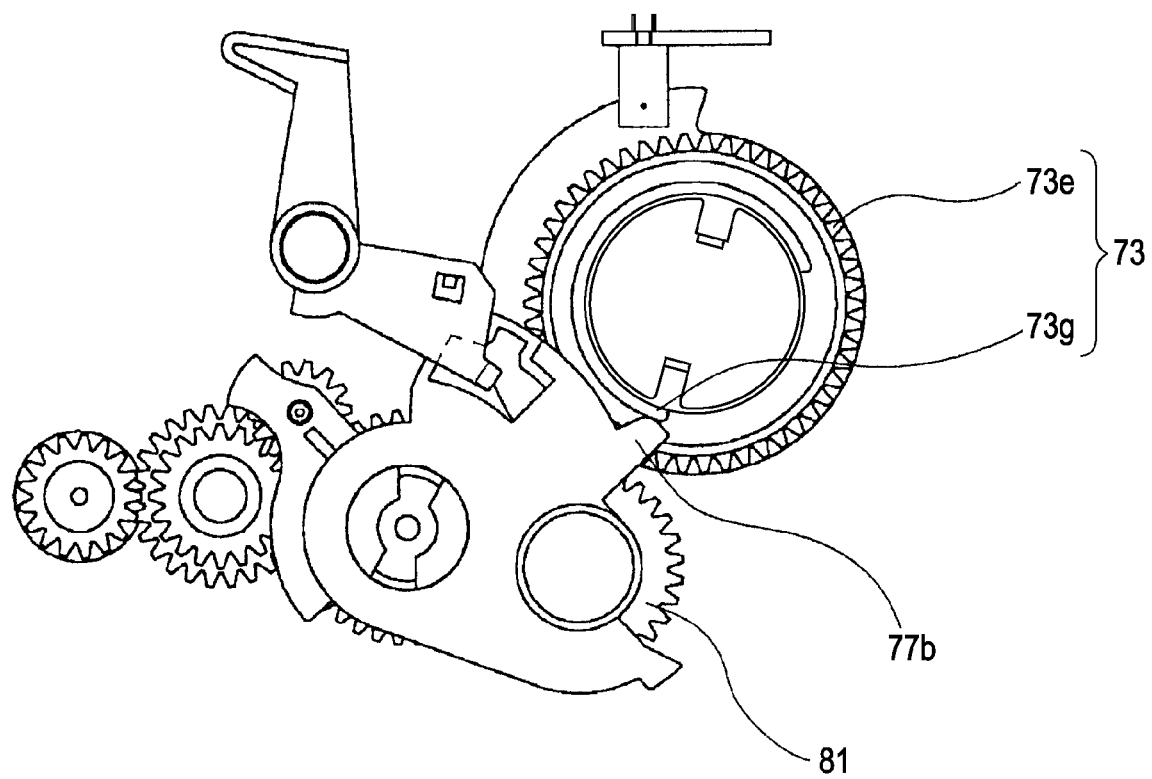
FIG. 9 is a side view that illustrates a state in which a first planetary gear and a control gear are disengaged.
Figure 10A:
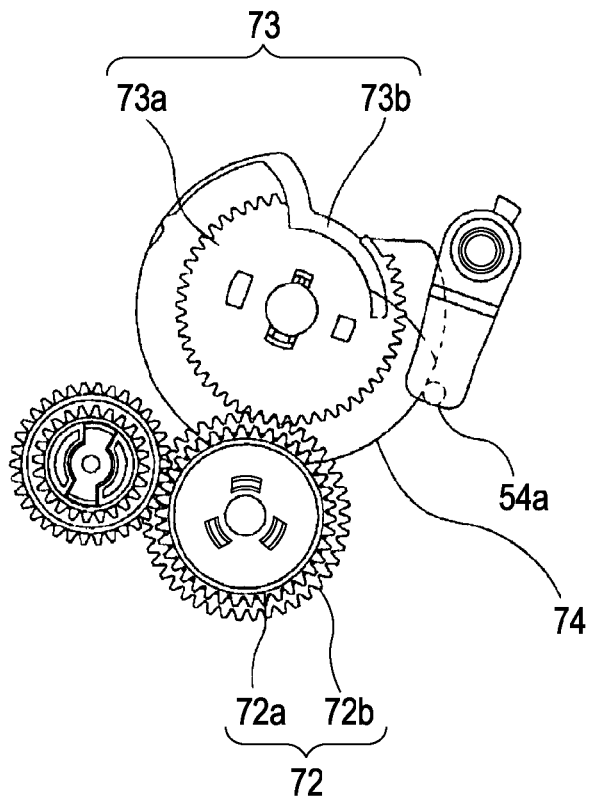
FIGS. 10A and 10B are side views that illustrate a state of a driving portion when a pressing plate descends.
Figure 10B:
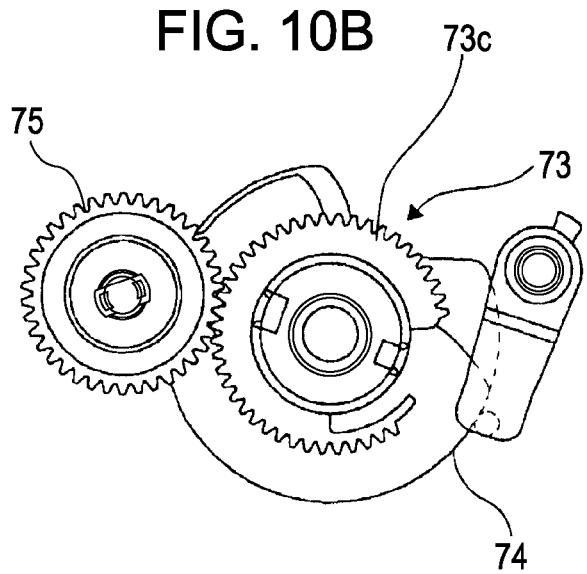

FIG. 9 illustrates a disengagement state in which the first planetary gear 81 and the control gear 73 are disengaged. FIGS. 10A and 10B illustrate a state of the driving portion when the pressing plate 51 descends. FIG. 10A illustrates an engagement state of the transmission gear 72 and the control gear 73. FIG. 10B illustrates an engagement state of the feeding roller gear 75 and the control gear 73.

Figure 11A:
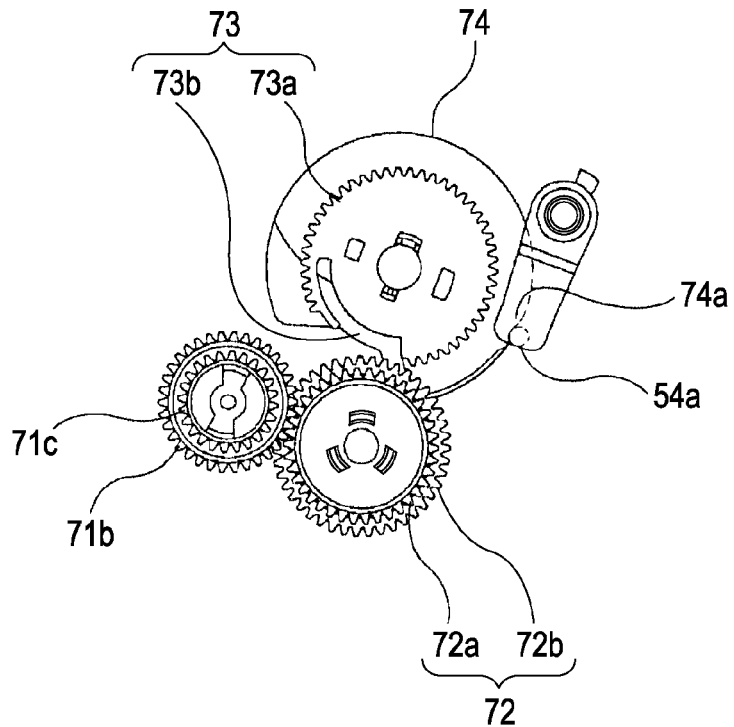
FIGS. 11A and 11B are side views that illustrate a state of a driving portion when feeding sheets is completed.
Figure 11B:
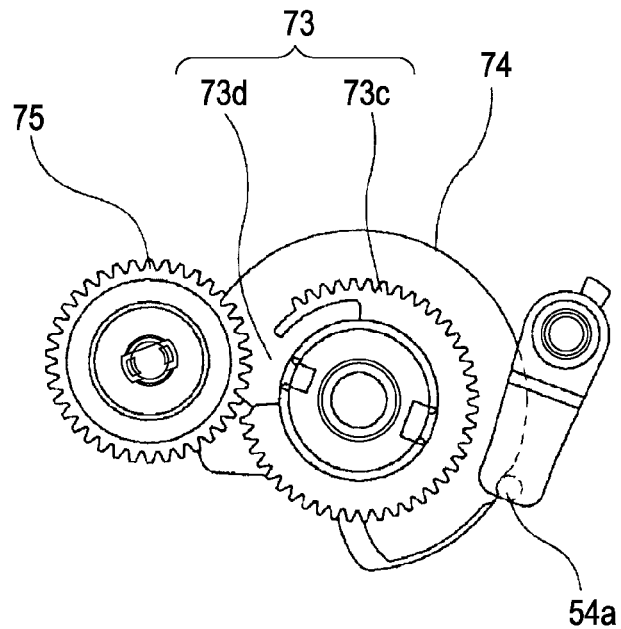

FIGS. 11A and 11B illustrate a state of the driving portion when feeding a sheet material is completed. FIG. 11A illustrates an engagement state of the transmission gear 72 and the control gear 73. FIG. 11B illustrates an engagement state of the feeding roller gear 75 and the control gear 73.

Figure 12A:
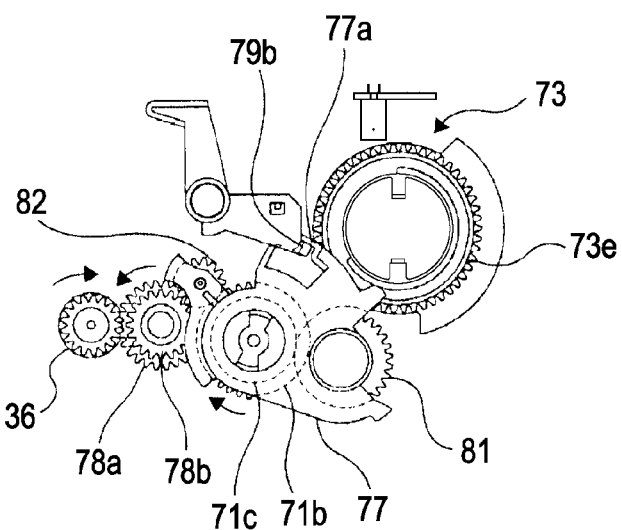
FIGS. 12A to 12C are side views that illustrate a state of a driving portion when a conveying roller is backwardly rotated to align a front end.
Figure 12B:
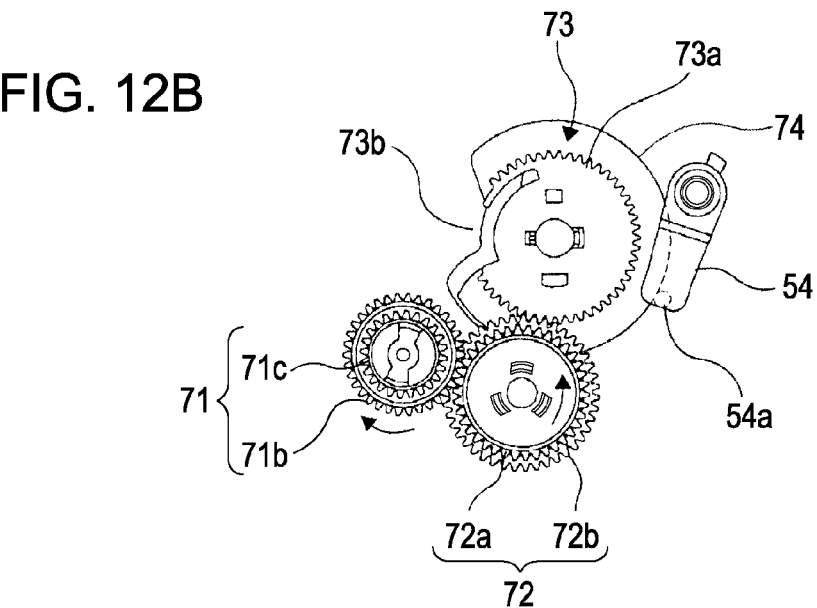
Figure 12C:
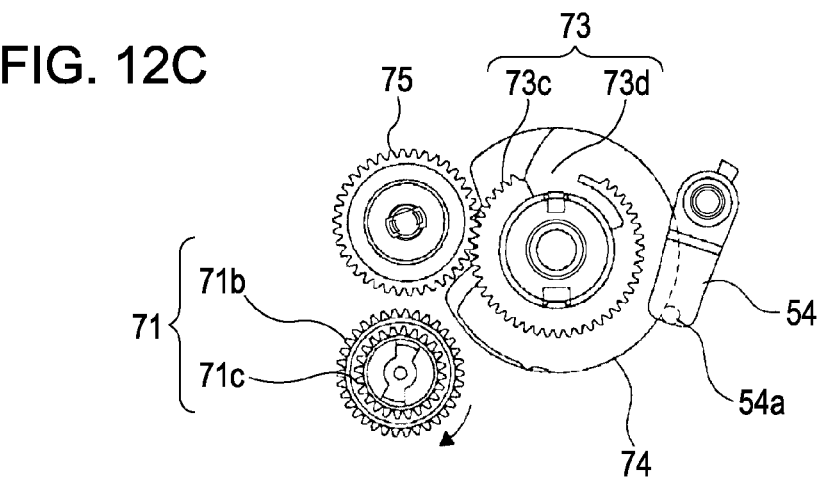

FIGS. 12A, 12B, and 12C illustrate a state of the driving portion when the convey roller is backwardly rotated to align the front end during feeding. FIG. 12A illustrates an engagement state of the fit section 77a of the swing arm 77 and the restricting section 79b of the stopper 79. FIG. 12B illustrates an engagement state of the transmission gear 72 and the control gear 73. FIG. 12C illustrates an engagement state of the feeding roller gear 75 and the control gear 73.

Next, a detailed configuration of the feeding device (feeding portion 2) described above and a configuration and operation of the drive switching mechanism are described in detail using FIGS. 5 to 12.

Initial State

In an initial state illustrated in FIGS. 5A to 5C, when the conveyance output gear 36 coaxial with the conveying roller 31 (FIG. 3) is counterclockwise rotated and the feeding roller gear 75 coaxial with the feeding roller 61 (FIG. 3) is clockwise rotated, a sheet material is conveyed in the direction in which a sheet material is conveyed. Due to the tension spring 79c, the stopper 79 is at a position where the restricting section 79b thereof and the fit section 77a of the swing arm 77 are engaged with each other. Because of this, even when the conveyance output gear 36 is driven in the direction in which a sheet material is conveyed and the sun gear 71 is driven counterclockwise, the swing arm 77 cannot swing toward the control gear 73. Because the first planetary gear 81 and the control gear 73 are in a disengagement state, the drive is not transmitted to the control cam 74 and the feeding roller 61. Because the toothless part 73b of the control gear 73 is adjacent to the transmission gear 72, even when the sun gear 71 is driven, the transmission gear 72 and the control gear 73 are in a disengaged state and the transmission gear 72 idles. Because the toothless part 73d of the control gear 73 is adjacent to the feeding roller gear 75, even when the feeding roller 61 is rotated by a sheet material, the control gear 73 is not rotated.

Feeding Starting Operation

Next, a case in which a sheet material is feed is described using FIGS. 6 to 13. To start feeding, first, the carriage 42 is moved to a position where the cam section 42a (FIG. 1) of the carriage 42 presses the working section 79a of the stopper 79 (hereinafter referred to as a feeding position). Then, as illustrated in FIG. 6, the restriction on swinging of the swing arm 77 by the restricting section 79b of the stopper 79 is removed. Accordingly, the swing arm 77 becomes able to swing in synchronization with rotation of the conveyance output gear 36. When the conveyance output gear 36 is driven counterclockwise, the gears are driven in the directions indicated by the arrows illustrated in FIGS. 7 A to 7C, the first planetary gear 81 and the third gear section 73e of the control gear 73 are engaged, and the control cam 74 and the control gear 73 are driven.

The control gear 73 constitutes a driven gear that receives a drive from a pendulum drive switching mechanism formed of the sun gear 71, the first planetary gear 81, and the swing arm 77. When the control gear 73 is driven, the first gear section 73a thereof and the gear section 72b of the transmission gear 72 are engaged. After that, the control gear 73 receives a drive from the transmission gear 72 and is driven so as to be rotated. At this time, a gear reduction ratio when the control gear 73 is driven from the sun gear 71 through the transmission gear 72 (second reduction ratio Z2) and a gear reduction ratio when the control gear 73 is driven from the sun gear 71 through the first planetary gear 81 (first reduction ratio Z1) are set so as to be different. More specifically, a reduction in the speed of the rotation of the control gear 73 through the first planetary gear 81 is set to be larger. In the present embodiment, Z1:Z2=1:1.5. Accordingly, because of this difference in reduction ratio, the control gear 73 driven through the transmission gear 72 is rotated faster than that driven through the first planetary gear 81. This serves to release the engagement between the control gear 73 and the first planetary gear 81. In this state, although the control gear 73 receives a drive from both the first planetary gear 81 and the transmission gear 72, because of the relationship in reduction ratio described above, the control gear 73 is rotated by the drive from the transmission gear 72.

Rise of Pressing Plate

Driving the feeding roller 61 and releasing the first end 54a of the pressing-plate release lever 54 restricted by the control cam 74 releases the restriction on the pressing plate 51 by the second end 54b (FIGS. 8A to 8C). Sheet materials on the pressing plate 51 are pressed into contact with the feeding roller 61, and they are separated and fed one by one. The front end of a separated sheet material is guided by the guiding members 21 and 22 (FIG. 2) and conveyed toward the nip portion 99 formed between the conveying roller 31 and the driven roller 32.

Release of Swing Arm

In a state where the first planetary gear 81 and the control gear 73 are engaged, the arm section 77b of the swing arm 77 protrudes above the locus of rotation of the cam section 73g of the control gear 73. After that, when the control gear 73 is driven so as to be further rotated, the cam section 73g comes into contact with the arm section 77b of the swing arm 77 and pushes it away, thus causing the swing arm 77 to swing in a direction in which the first planetary gear 81 and the control gear 73 are disengaged and become separated away from each other (FIG. 9). The fit section 77a of the swing arm 77 being separated by the cam section 73g is at a position corresponding to the restricting section 79b of the stopper 79. In this state, when the carriage 42 (FIG. 1) is withdrawn from the feeding position, the fit section 77a of the swing arm 77 and the restricting section 79b of the stopper 79 become engaged, and the swing arm 77 is maintained in a state where the swing arm 77 cannot swing.

Pushing Pressing Plate Down

When sheet materials are separated, a separated sheet material is fed, and the control gear 73 is driven so as to be rotated, then the first end 54a of the pressing-plate release lever 54 pivots along the cam surface of the control cam 74 (FIGS. 10A and 10B) and pushes the pressing plate 51 (FIG. 2) down in the direction that becomes separated from the feeding roller 61 (FIG. 2) against an urging force of the pressing spring (not shown). Up to this point, pushing the pressing plate 51 down is completed.

Alignment of Front End

The apparatus according to the present embodiment can convey a sheet material both with or without alignment of the front end, depending on the type of a fed sheet material. Here, three conveying modes (first to third conveying modes) are discussed.

First, the third conveying mode is described. In this mode, after the front end of a sheet material is caught in the nip portion 99 formed between the conveying roller 31 and the driven roller 32, the conveying roller 31 is temporarily rotated in a returning direction (reversed) to align the front end of the sheet material. This operation returns the front end of the sheet material to the nip portion 99 and is aligned with the tangent line of the nip portion 99. An operation performed thereafter of driving the conveying roller 31 again in the direction in which a sheet material is conveyed is described below.

At this time, the gears are driven in the directions indicated by the arrows illustrated in FIGS. 12A to 12C by the reversing performed to align the front end. At this time, the fit section 77a of the swing arm 77 and the restricting section 79b of the stopper 79 are in an engaged state, and their movement is restricted. The counterclockwise drive is transmitted by the sun gear 71 to the transmission gear 72, and the gear section 72a engaging with the sun gear 71 is rotated counterclockwise. However, the one-way clutch unit (not shown) disposed between the gear section 72a and the gear section 72b prevents the gear section 72b engaging with the control gear 73 from being rotated, and the drive is not transmitted to the control gear 73. Although a force that reverses the rotation of the feeding roller 61 is produced by the reversed sheet material, because the reversed rotation of the control gear 73 is prevented by the control gear clutch 80, the control cam 74 and the feeding roller 61 are not reversely rotated. After the completion of alignment of the front end, when the conveying roller 31 is driven in the direction in which a sheet material is conveyed, the engagement state of the gear section 72b of the transmission gear 72 and the first gear section 73a of the control gear 73 remains. Accordingly, the drive is transmitted to the feeding roller 61 without delay in engagement caused by operation of the swing arm 77, by engagement between the gear sections of the transmission gear 72 and the control gear 73, and by tooth bearing. Thus, the sheet material is stably caught in the nip portion 99 again.

Feeding Finishing Operation

After that, when driving in the direction in which a sheet material is conveyed is further carried out, the toothless part 73b of the control gear 73 reaches the position of the transmission gear 72, the transmission of the drive to the control gear 73 terminates, and the rotation of the control gear 73 stops. At this time, the toothless part 73d also reaches the position of the feeding roller gear 75, the rotation of the feeding roller 61 becomes free, and the feeding roller 61 becomes able to rotate together with the sheet material conveyed by the conveying portion 3. The control cam 74 has an inclined section 74a (FIG. 11A) in the cam surface at a position that corresponds to the first end 54a of the pressing-plate release lever 54. An urging force of the pressing plate spring serving as an urging member is applied to the pressing-plate release lever 54 and is pressed against the cam surface. Therefore, in the case where the toothless part 73b reaches the transmission gear 72, the first end 54a of the pressing-plate release lever 54 pushes the inclined section 74a, and rotates the control gear 73 ahead by a slight angle after the drive of the control gear 73 terminates. This can stably separate the tip of the first gear section 73a of the control gear 73 and the tip of the gear section 72b of the transmission gear 72 from each other and thus can prevent an unusual sound or a defect in release of a drive caused by hitting of the gear tips.

A series of feeding operations for a single sheet material is completed here.

Figure 13A:
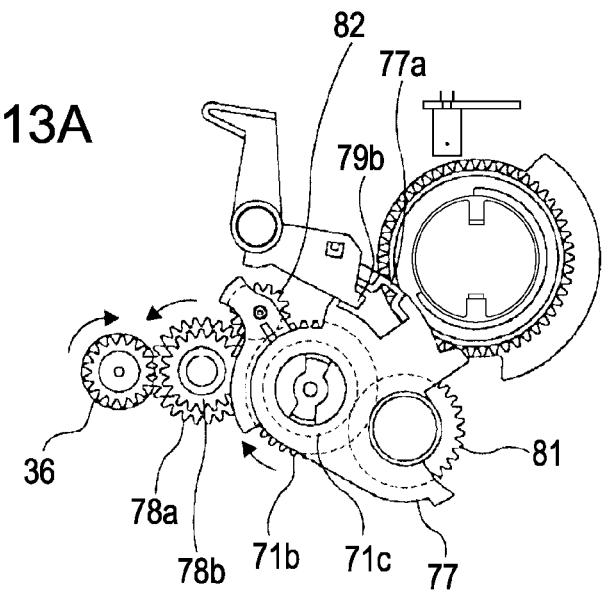
FIGS. 13C to 13C are side views that illustrate a state of a driving portion when a conveying roller is backwardly rotated to align a front end.
Figure 13B:
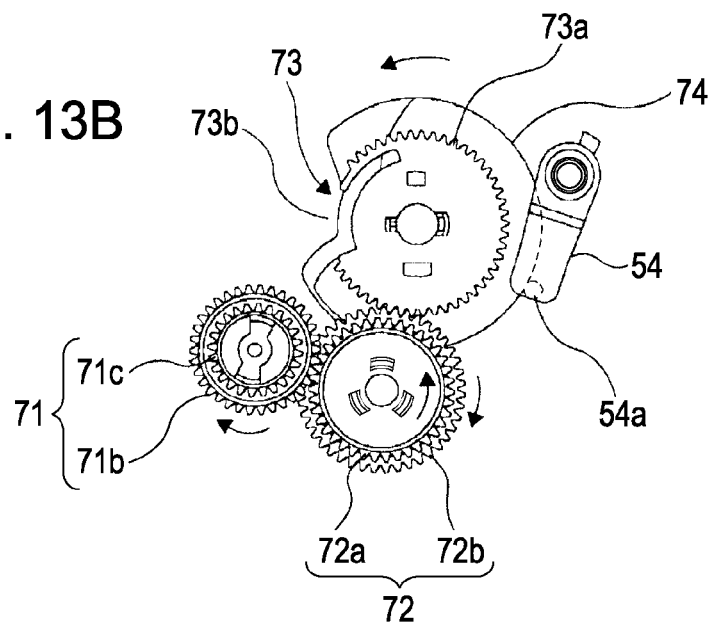
Figure 13C:
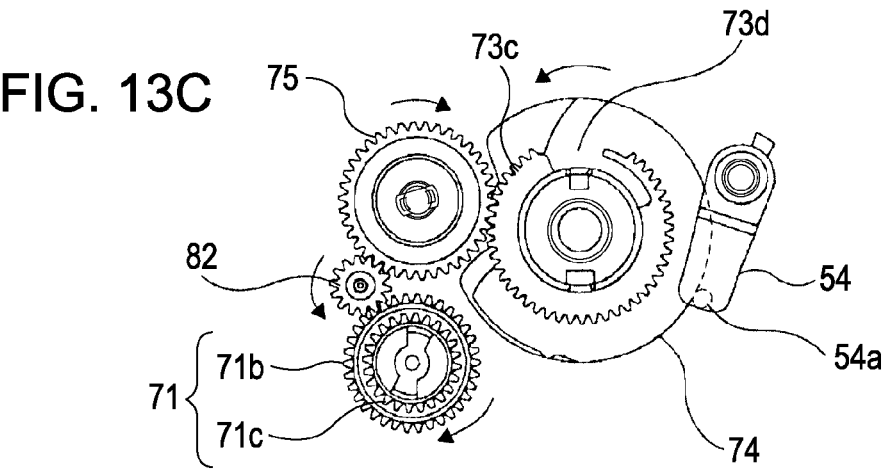

Depending on the type of a sheet material, it may be useful that, after the front end of the sheet material comes into contact with the tangent line of the nip portion 99 formed between the conveying roller 31 and driven roller 32 being reversed and is aligned with the line formed at the nip, the conveying roller 31 be driven again in the direction in which a sheet material is conveyed. FIGS. 13A to 13C illustrate an operation of the driving portion 7. The part of the series of operations described above other than the alignment of the front end is the same, so the description thereof is not repeated here.

Other Alignment of Front End

In the second conveying mode, before a sheet material separated one by one reaches the nip portion 99 (FIG. 2), the conveying roller 31 is reversed. That is, the gears are driven in the directions indicated by the arrows illustrated in FIGS. 13A to 13C. At this time, moving the carriage 42 (FIG. 1) to the feeding position again disengages the fit section 77a of the swing arm 77 and the restricting section 79b of the stopper 79, and the swing arm 77 becomes able to swing. At this time, the swing arm 77 receives a clockwise rotational force, and the second planetary gear 82 engages with the feeding roller gear 75. The feeding roller gear 75 is driven in the clockwise direction by the sun gear 71 through the second planetary gear 82, and the feeding roller 61 still has a conveying force for conveying a sheet material being subjected to separation and conveying toward the nip portion 99. In addition, the control gear 73 also receives a drive from the feeding roller gear 75 and is rotated in the counterclockwise direction, and the transmission gear 72 engaging with the control gear 73 is driven so as to be rotated in the clockwise direction. The counterclockwise drive is transmitted to the transmission gear 72 by the sun gear 71, and the gear section 72a engaging with the sun gear 71 is rotated in the counterclockwise direction. However, the one-way clutch unit (not shown) disposed between the gear section 72a and the gear section 72b prevents the drive from being transmitted to the gear section 72b engaging with the control gear 73, so the drive is not transmitted to the control gear 73. Therefore, even when the conveying roller 31 is driven so as to be reversely rotated, the sheet material can be conveyed until the front end of the sheet material reaches the nip portion 99 being reversed. Driving the conveying roller 31 in the forward direction (counterclockwise in the drawings) after the sheet material is brought into contact with the nip portion 99 and aligned with the nip causes the sheet material to be caught in the nip portion 99 and conveyed to the recording portion 4. At this time, the swing arm 77 is driven so as to be rotated in the counterclockwise direction, the second planetary gear 82 becomes disengaged with the feeding roller gear 75, and the first planetary gear 81 attempts to swing in a direction in which it engages with the control gear 73. However, the first planetary gear 81 comes into contact with the cam section 73g on the control gear 73, so the engagement is restricted. After that, the carriage 42 is withdrawn from the feeding position, the fit section 77a of the swing arm 77 and the restricting section 79b of the stopper 79 become engaged again, and the swing arm 77 is maintained in a state in which it cannot swing.

In the case of a thick strong sheet material, the above alignment of the front end may be unnecessary. In this case, the above alignment of the front end is not performed, and the sheet material is caught in the nip portion 99 and then conveyed to the recording portion without any processing. In the present invention, conveying without the alignment of the front end is called the first conveying mode.

As described above, in the recording apparatus having a configuration in which a sheet material is fed and conveyed using the same driving source, regardless of the presence or absence of alignment of the front end, both the feeding starting operation and the feeding terminating operation require no drive reversing operation. Accordingly, the operation can smoothly move from the feeding operation to the conveying and recording operations. This can avoid a reduction in throughput caused by a temporary stop of conveying a sheet and a reverse between the end of feeding and the start of recording. It is not necessary to finely rotate the conveying motor in forward and backward directions, so the advantage of being capable of simplifying the control sequence is also obtainable. For a drive switching mechanism that utilizes a pendulum mechanism, if responsivity of the pendulum is not good, feeding tends to be defective, so it is desired that it is able to responsively follow rotation of a sun gear. For the drive switching mechanism according to the present embodiment, because the first planetary gear 81 for starting feeding is required only in starting rotation of the control gear 73 from an initial state and thus a configuration in which a large load is not applied during feeding, the size and weight can be reduced. Accordingly, the drive switching mechanism according to the present embodiment is advantageous in that the responsivity of the swing arm 77 is enhanced and the reliability of feeding is also increased.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

What is claimed is:

1. A drive switching mechanism for switching between transmission and non-transmission of a driving force from an input gear to an output gear, the drive switching mechanism comprising:
a transmission gear configured to transmit a drive from the input gear to the output gear;
a planetary gear configured to transmit a drive from the input gear to the output gear;
a swinging member configured to hold the planetary gear such that the planetary gear can swing around the input gear and can engage with the output gear;
a retaining unit configured to retain the swinging member in either one of a state in which the swinging member can swing and a state in which the output gear and the planetary gear are not engaged; and
a releasing unit configured to disengage the planetary gear from the output gear,
wherein the output gear includes a toothless part that does not engage with the transmission gear and that does not receive a drive from the transmission gear,
the retaining unit retains the swinging member such that the swinging member can swing in a state in which the transmission gear and the output gear are disengaged by the toothless part,
the input gear is driven in a rotational direction so that the planetary gear engages with the output gear and rotates the output gear, and
after the toothless part is passed and the transmission gear and the output gear become engaged, the releasing unit disengages the planetary gear from the output gear while the input gear rotates in the rotational direction.

2. The drive switching mechanism according to claim 1, wherein the output gear includes a cam section, the swinging member includes a cam follower section, and the cam section and the cam follower section constitute the releasing unit.

3. The drive switching mechanism according to claim 1, wherein, in a state where the planetary gear and the output gear are disengaged by the releasing unit, the retaining unit retains the planetary gear and the output gear in the disengaged state.

4. The drive switching mechanism according to claim 1, wherein a first reduction ratio from the input gear to the output gear through the planetary gear is smaller than a second reduction ratio from the input gear to the output gear through the transmission gear.

5. The drive switching mechanism according to claim 1, further comprising an urging member configured to apply an urging force for rotating the output gear by an angle required for separating a gear tip of the output gear and a gear tip of an end of the toothless part when the transmission gear reaches the toothless part.

6. A drive transmission mechanism for transmitting a driving force from an input gear to an output gear comprising:
a transmission gear configured to transmit a drive from the input gear to the output gear;
a planetary gear configured to transmit a drive from the input gear to the output gear;
a swinging member configured to hold the planetary gear such that the planetary gear can swing around the input gear and can engage with the output gear; and
a releasing unit configured to disengage the planetary gear from the output gear,
wherein the output gear includes a toothless part that does not engage with the transmission gear and that does not receive a drive from the transmission gear,
wherein in a state in which the transmission gear and the output gear are disengaged by the toothless part, the input gear is driven in a direction so that the planetary gear engages with the output gear, and
after the toothless part is passed and the transmission gear and the output gear become engaged, the releasing unit disengages the planetary gear from the output gear while the input gear rotates in the rotational direction.

7. The drive transmission mechanism according to claim 6, wherein the output gear includes a cam section, the swinging member includes a cam follower section, and the cam section and the cam follower section constitute the releasing unit.

8. The drive transmission mechanism according to claim 6, wherein a first reduction ratio from the input gear to the output gear through the planetary gear is smaller than a second reduction ratio from the input gear to the output gear through the transmission gear.

9. The drive transmission mechanism according to claim 6, further comprising an urging member configured to apply an urging force for rotating the output gear by an angle required for separating a gear tip of the output gear and a gear tip of an end of the toothless part when the transmission gear reaches the toothless part.

* * * * *